Nov. 10, 1936.  J. H. VAN CAPPELLEN  2,060,433
CONTROL DEVICE FOR ONE OR MORE MACHINES
Filed Sept. 10, 1934
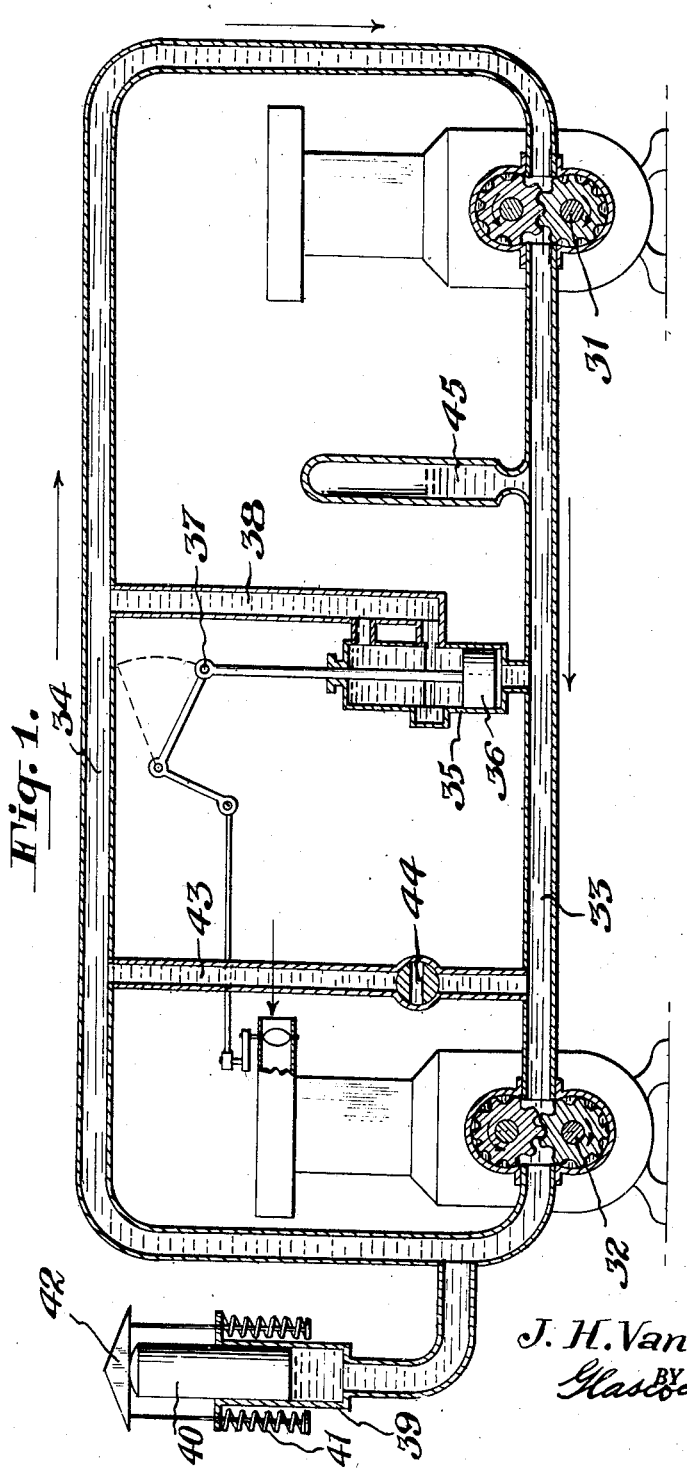
INVENTOR:
J. H. Van Cappellen
BY
Glascock Downing Seebold
ATTORNEYS.

Patented Nov. 10, 1936

2,060,433

UNITED STATES PATENT OFFICE 2,060,433

CONTROL DEVICE FOR ONE OR MORE MACHINES

Johan Hendrik van Cappellen, Japara Rembang, Dutch East Indies

Application September 10, 1934, Serial No. 743,440
In the Netherlands September 19, 1933

1 Claim. (Cl. 60—97)

This invention relates to a control device for one or more machines and has for its object to provide a device whereby one machine may be caused to run synchronously or asynchronously with another or with the aid of which the speed of a machine may be so controlled as to keep the number of revolutions constant.

A device of this kind is very useful where two or more machines have to run at the same speed or at speeds which have a constant ratio.

Furthermore, the device according to the invention is of importance for the distant control of ship or other engines.

According to the invention the machine to be controlled, or one of the machines to be controlled drives a pump the intake of which is connected through a pipe to a device adapted to cause liquid to flow in said pipe under adjustable pressure, the pipe being in communication with means (e. g. a piston disposed in a cylinder, a diaphragm or the like) connected to the energy feed arrangement of the machine or machines to be controlled.

The advantage of such hydraulic control device consists in this that the various machines are not connected together by mechanical devices but only through liquid carrying pipes which in aircraft or in a ship may be mounted in any desired position.

According to the invention the feed device of the pressure fluid may consist of a pump the discharge of which is adjustable, for example owing to the fact that it may be driven at adjustable speed. If the last mentioned pump is driven by one machine and the first mentioned pump by another machine, then if the output of both pumps is equal and a difference occurs in the driving speed of the pumps, the energy supply of one of the machines will be so influenced that this machine will again be adjusted to the same speed as the other machine. Therefore only one machine need be adjusted to the desired speed, while the other machine or machines will be automatically adjusted to the same speed.

Furthermore, this device may obviously be utilized for controlling a machine from a distance.

Furthermore, according to the invention the pressure side of one pump may be connected with the intake side of the next pump and so on, in order to form a closed circuit which is connected with a liquid accumulator in order to maintain the required pressure in the system and to prevent the liquid from forming an emulsion with air.

The device according to the invention may further be arranged in such a way that two branches of the circuit are connected by a pipe comprising a shut-off device by means of which the pressure difference may be eliminated and the control device may be rendered inoperative.

Figure 1 is a diagrammatic showing of the control device.

Figure 2 is a diagrammatic showing of an alternative type pump that may be used in plac of that shown at the right side of Figure 1.

The drawing illustrates an embodiment of the control device according to the invention by way of example. The machine running at the desired speed drives a pump 31, while a second machine which is to be controlled to run synchronously with the first mentioned machine drives a pump 32. These pumps are of such capacity that depending upon their driving speed they have the same output and they may be, for example, in the form of gear pumps as shown in Fig. 1. The delivery side of pump 31 is connected by a pipe 33 to the intake side of pump 32, while the delivery side of pump 32 is connected to the intake side of pump 31 by a pipe 34, so that a closed circuit is formed.

The pipe 33 communicates with a cylinder 35 in which reciprocates a piston 36, while the piston rod 37 secured thereto is connected to the energy feed arrangement of the machine to be controlled. The upper side of the cylinder and an opening midways up the cylinder are connected by pipe 38 to pipe 34, so that in this space the pressure is the same as in the pipe mentioned.

Furthermore, the pipe 34 is connected to a fluid accumulator 39 wherein is disposed a piston 40 which is pressed into the cylinder by springs 41 and a yoke 42. A pipe 43 is disposed between the pipes 33 and 34 which may be shut off by means of a cock 44. The pipe 33 is provided with an air receiver 45.

The operation of the device is as follows:—

When the machine to be controlled runs slower than the constant speed device the output of pump 31 is larger than that of pump 32, so that in the pipe 33 the pressure is increased whereby the piston 36 is raised. By this means the energy supply arrangement serving the machine connected to pump 32 is opened wider and the speed of this machine is increased until both machines run at the same speed or at the required speed ratio and equalization in the output of the pumps 31 and 32 is obtained. If the pressure in the pipe 33 is increased the piston rises to such an extent that the liquid is able to enter the pipe 34 through the opening in the cylinder and the pipe 38.

If, on the contrary, the auxiliary machine were to run faster than the main machine, then a larger pressure would obtain above the piston and same would sink causing the feed of energy to the auxiliary machine to be reduced.

The process of starting up the machine is as follows:—

The cock 44 is opened, whereby the control device is put out of action because the pressure above and below the piston 36 is the same and the piston is free to move in the cylinder. If it is now desired to equalize the speed of the two machines the cock 44 is closed, whereupon the device is enabled to operate in the manner described above.

Under certain circumstances, e. g. in case of failure of one of the machines it is desirable to render the control device inoperative. This may be done by opening the cock 44 so that the other machine may be used independently of the other one.

The liquid accumulator 39 has for its object to compensate for leakage of the liquid, to compensate for excess pressure caused by expansion of the liquid due to increase of temperature, to assure that the pumps are well filled, to maintain pressure upon the piston 36 so that special springs are made superfluous, and finally to prevent the liquid from forming an emulsion with air.

The air receiver 45 has for its object to delay the control and to prevent fluctuation in the number of revolutions of the auxiliary machine when the speed is varied.

The drive of the pumps from the controlling and the controlled engines may be effected in any known suitable way. By using various change speed ratios it is possible to cause the machines to run with the same relative speed variations. For example, if it is desired to run an auxiliary machine at a speed which is 5% higher than the speed of the main machine, then the auxiliary machine will at all speeds run 5% faster than the main machine. Obviously, it is also possible to run the machines in opposite directions.

In order to obtain a synchronous or an asynchronous control it is also possible to substitute a pump of adjustable output, as any known type of positive displacement variable delivery pump, for one of the gear pumps 31 or 32 as shown in Fig. 2 at 31'. In this case the driving speed of the adjustable pump may be kept constant and the control is effected by adjusting the output of the pump.

The device described has the advantage that owing to its simplicity it can be manufactured at a low cost, while it is very reliable in operation. Furthermore, the forces required for varying the feed of energy to the machine or machines to be controlled are very small, so that the device may be very light in construction and does not add objectionable load to the aircraft.

I claim:—

In a device for the control of at least one engine by a master engine, a positive displacement pump driven by said master engine, a pump driven by the engine to be controlled, a pipe connecting the pumps in a closed circuit in series, a cylinder communicating adjacent its ends respectively with the flow and return sections of the circuit defined by the pumps, a piston in said cylinder, subject on opposite sides to the pressure in the flow and in return sections of the circuit, means coupling said piston to the energy supply control of the engine to be controlled, said cylinder having an intermediate aperture communicating with the return section of the conduit, whereby on undue increase in the output of the master pump the said aperture is put in communication with the cylinder below the piston and short circuits the pump associated with the engine to be controlled until such time as the said engine accelerates to the desired speed.

JOHAN HENDRIK van CAPPELLEN.